United States Patent
Ohnishi et al.

(10) Patent No.: US 6,751,092 B1
(45) Date of Patent: Jun. 15, 2004

(54) ELECTRONIC APPARATUS AND DISK UNIT MOUNTING MECHANISM

(75) Inventors: Masuo Ohnishi, Kawasaki (JP); Toyokazu Hamaguchi, Kawasaki (JP); Hiroshi Mutoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/184,878

(22) Filed: Nov. 3, 1998

(30) Foreign Application Priority Data

Nov. 6, 1997 (JP) .............................. 9-304640
Oct. 28, 1998 (JP) ............................ 10-307085

(51) Int. Cl.⁷ ................................ G05F 1/16
(52) U.S. Cl. ........................ 361/685; 361/683; 248/560
(58) Field of Search ................ 361/679, 683–686; 248/560, 603, 644, 610–615, 638, 634; 364/708; 360/97.02

(56) References Cited

U.S. PATENT DOCUMENTS

| | | | |
|---|---|---|---|
| 3,191,896 A | 6/1965 | Nathan et al. ................ 248/22 |
| 3,436,042 A | 4/1969 | Van Goubergen ............ 248/22 |
| 4,002,315 A | 1/1977 | Van Goubergen ............ 248/24 |
| 4,436,274 A | 3/1984 | Kramer ....................... 248/633 |
| 4,685,303 A * | 8/1987 | Branc et al. ................. 361/685 |
| 4,713,714 A * | 12/1987 | Gatti et al. .................. 248/638 |
| 4,896,777 A | 1/1990 | Lewis ........................... 211/41 |
| 4,980,786 A | 12/1990 | O'Sullivan et al. ....... 360/97.03 |
| 5,216,582 A | 6/1993 | Russell et al. .............. 361/395 |
| 5,337,998 A | 8/1994 | Nemoto ....................... 248/634 |
| 5,349,486 A | 9/1994 | Sugimoto et al. ........ 360/97.01 |
| 5,366,200 A | 11/1994 | Scura .......................... 248/632 |
| 5,402,308 A | 3/1995 | Koyanagi et al. ........... 361/685 |
| 5,463,527 A * | 10/1995 | Hager et al. ................ 361/685 |
| 5,478,058 A | 12/1995 | Tucchio et al. ............. 267/136 |
| 5,491,608 A | 2/1996 | Koyanagi et al. ........... 361/685 |
| 5,557,499 A | 9/1996 | Reiter et al. ............... 361/685 |
| 5,654,875 A * | 8/1997 | Lawson ...................... 361/685 |
| 5,673,171 A * | 9/1997 | Varghese et al. ........... 361/685 |
| 6,021,041 A * | 2/2000 | Genix et al. ................ 361/685 |

FOREIGN PATENT DOCUMENTS

| | | |
|---|---|---|
| EP | 0 570 138 | 11/1993 |
| JP | 59-135504 | 9/1984 |
| JP | 3-241583 | 10/1991 |
| JP | 4-109484 | 4/1992 |
| JP | 4-349288 | 12/1992 |
| JP | 8-255471 | 10/1996 |
| JP | 8-293189 | 11/1996 |
| JP | 9-153277 | 6/1997 |
| WO | 99/06902 | 2/1999 |

OTHER PUBLICATIONS

Panasonic PRONOTE (Catalog).
Sorbothane (Catalog).
Microcell Polymer Sheet PORON (Catalog).
Microcell Polymer Sheet PORON (Catalog).

* cited by examiner

*Primary Examiner*—Darren Schuberg
*Assistant Examiner*—Yean-Hsi Chang
(74) *Attorney, Agent, or Firm*—Armstrong, Kratz, Quintos, Hanson & Brooks, LLP

(57) ABSTRACT

An electronic apparatus mounted with a disk unit, and a vibration and/or shock absorbing member which absorbs vibration and/or shock is provided between the disk unit and a lid member which covers a disk unit accommodating part provided in a housing of the electronic apparatus.

30 Claims, 10 Drawing Sheets

ELECTRONIC APPARATUS AND DISK UNIT MOUNTING MECHANISM

BACKGROUND OF THE INVENTION

Field of the Invention

The present invention generally relates to electronic apparatuses and disk unit mounting mechanisms, and more particularly to an electronic apparatus and a disk unit mounting mechanism having a shock-resistant mounting structure of a disk unit such as a hard disk drive (HDD) in a portable electronic apparatus such as a notebook type personal computer.

In this specification, the disk unit refers to a magnetic disk unit, an optical disk unit, a magneto-optic disk unit, a hard disk drive, a floppy disk drive (FDD), a CD-ROM drive and the like which record and/or reproduce information on and/or reproduce information from a disk-shaped recording medium.

Recently, the performance of the notebook type personal computer has improved, and it is becoming popular to mount in the notebook type personal computer a hard disk drive which has a large storage capacity and a high operation speed compared to a floppy disk drive.

A description will be given of a hard disk drive mounting structure of a conventional notebook type personal computer, by referring to FIG. 1.

FIG. 1 is a disassembled perspective view of a notebook type personal computer 50 mounted with a hard disk drive. In FIG. 1, a hard disk drive (HDD) 52 is mounted in a HDD accommodating part provided on a back side of a front right of a housing 51 of the notebook type personal computer 50.

In this case, the HDD 52 accommodates a disk-shaped storage media, a head, a motor and the like. The HDD 52 is fixed on an HDD mounting metal fitting 53 by a screw 54 so that a printed circuit side of the HDD 52 faces a HDD cover 57. The metal fitting 53 is fixed on the housing 51 by a screw 55.

In addition, a flexible printed circuit (FPC) cable 56 mounted on the housing 51 is arranged so as to electrically connect to the printed circuit of the HDD 52. Thereafter, the HDD cover 57 slides to cover the HDD accommodating part of the housing 51, and the HDD cover 57 is fixed to the housing 51 by screws 58. No shock absorbing material or the like is used.

In the case of a magnetic disk drive mounted in a lap-top computer or the like, it has been proposed in Japanese Laid-Open Patent Application No.3-241583, for example, to provide a plurality of vibration-preventing rubber pieces between a housing and a side surface of the magnetic disk drive, so as to prevent a positioning error from being generated due to vibration of a magnetic head. It has also been proposed to use a combination of a plurality of vibration-preventing rubber pieces having damping characteristics with different temperature dependencies, so as to cope with a wide a range of temperature changes. In addition, its has also been proposed to use Sorbothane (trademark) which is made of an ether system polyurethane as the vibration-preventing rubber.

In addition, in the case of a fixed magnetic disk drive used in a large scale computer, it has been proposed in a Japanese Laid-Open Utility Model Application no.59-135504, for example to make the magnetic disk drive portable by accommodating the magnetic disk drive in an external box. It has been vaguely proposed to provide a plurality of shock absorbers such as shock absorbing rubber pieces between the external box and inner top, bottom and side surfaces of a main body of the magnetic disk drive, so as to greatly relax restricting conditions with respect to the vibration and shock.

However, in the notebook type personal computer mounted with the HDD described above, the HDD itself is becoming smaller and lighter due to the increased recording density of the HDD. Particularly when the HDD is light in weight there are increased opportunities for the HDD to be carried. On the other hand, the mechanical strength of the HDD deteriorates as the HDD becomes smaller. As a result, a shock applied on the HDD while the HDD is carried or during operation of the HDD may generate a fault.

For example, because the conventional HDD is fixed to the housing of the notebook type personal computer by screws, the magnetic head makes contact with the disk-shaped storage media when a shock is applied on the HDD which is carried or during operation of the HDD. The disk-shaped media is damaged when the magnetic head makes contact with the disk-shaped storage media, and this damage causes data destruction thereby generating a fault.

On the other hand, if a floating structure is used for the HDD, it becomes impossible to accurately set a head position due to residual vibration accompanying the rotation of the disk-shaped storage media when making a seek operation to make the magnetic head seek a recording region during operation. In this case, a read error is generated.

Further, in the case of the lap-top computer or the like, the vibration preventing rubber is provided on the side surface of the magnetic disk drive in order to make the magnetic disk drive vibration proof. However, no special considerations are made with respect to the shock, particularly the shock applied on the magnetic disk drive when the computer is carried. For this reason, the vibration preventing rubber does not provide a solution to the problems introduced when the magnetic disk drive is carried.

Moreover, the portable fixed magnetic disk drive described above is not intended for the general user, and the fixed magnetic disk drive is considerably large compared to the HDD mounted in the notebook type personal computer. For this reason, there are no strict demands to reduce the size and weight of the fixed magnetic disk drive, and various kinds of measures may be taken against the vibration and shock applied on the fixed magnetic disk drive. However, such measures which may be taken in the fixed magnetic disk drive do not suggest particular measures which may be taken with respect to the notebook type personal computer which is used by the general user and in which restricting conditions exist to reduce the size and weight of the HDD.

SUMMARY OF THE INVENTION

Accordingly, it is a general object of the present invention to provide a novel and useful electronic apparatus and a disk unit mounting mechanism, in which the problems described above are eliminated.

Another and more specific object of the present invention is to eliminate the problem of data destruction caused by the shock applied on the disk unit such as the HDD, and to provide a disk unit mounting structure having improved reliability.

Still another object of the present invention is to provide an electronic apparatus mounted with a hard disk drive, wherein vibration and/or shock absorbing members which absorb vibration and/or shock are provided between the hard disk drive and a lid member which covers a hard disk drive accommodating part provided in a housing of the electronic apparatus. According to the present invention, it is possible to improve the vibration resistance and the shock resistance because the hard disk drive is protected by small pieces of the vibration and/or shock absorbing members. As a result, it is possible to prevent data destruction from being generated in the hard disk drive due to the shock and to prevent a read error from being generated in the hard disk drive due to the vibration. Accordingly, the reliability of the portable electronic apparatus such as the notebook type personal computer is greatly improved.

A further object of the present invention is to provide an electronic apparatus mounted with a hard disk drive, comprising vibration and/or shock absorbing members which are formed by a plurality of small pieces and absorb vibration and/or shock are provided between the hard disk drive and a hard disk drive accommodating part provided in a housing of the electronic apparatus, and a sheet member is provided between the hard disk drive and the plurality of small pieces forming the vibration and/or shock absorbing members. According to the present invention, it is possible to improve the vibration resistance and the shock resistance because the hard disk drive is protected by small pieces of the vibration and/or shock absorbing members. As a result, it is possible to prevent data destruction from being generated in the hard disk drive due to the shock and to prevent a read error from being generated in the hard disk drive due to the vibration. Accordingly, the reliability of the portable electronic apparatus such as the notebook type personal computer is greatly improved. Further, it is possible to prevent direct contact with the vibration and/or shock absorbing members and the hard disk drive, so that the vibration and/or shock absorbing members will not be deformed at the time of the assembling process and moisture absorbed by the vibration and/or shock absorbing members will not cause an electrical short-circuit even if the vibration and/or shock absorbing members are provided on a side of the hard disk drive having exposed wirings and/or electrical circuits.

Another object of the present invention is to provide an electronic apparatus mounted with a hard disk drive, wherein vibration and/or shock absorbing members are provided between the hard disk drive and an inner bottom surface and inner side surfaces of a hard disk drive accommodating part provided in a housing of the electronic apparatus, and the vibration and/or shock absorbing members provided between the hard disk drive and the inner bottom surface and the vibration and/or shock absorbing members provided between the hard disk drive and the inner surface are made of mutually different materials. According to the present invention, it is possible to improve the vibration resistance and the shock resistance because the hard disk drive is protected by small pieces of the vibration and/or shock absorbing members. As a result, it is possible to prevent data destruction from being generated in the hard disk drive due to the shock and to prevent a read error from being generated in the hard disk drive due to the vibration. Accordingly, the reliability of the portable electronic apparatus such as the notebook type personal computer is greatly improved.

Another object of the present invention is to provide an electronic apparatus mounted with a hard disk drive, wherein a plurality of vibration and/or shock absorbing members made of different materials and having different thicknesses are provided with respect to at least one of confronting surfaces of the hard disk drive and a hard disk drive accommodating part provided in a housing of the electronic apparatus. According to the present invention, it is possible to improve the vibration resistance and the shock resistance because the hard disk drive is protected by small pieces of the vibration and/or shock absorbing members. As a result, it is possible to prevent data destruction from being generated in the hard disk drive due to the shock and to prevent a read error from being generated in the hard disk drive due to the vibration. Accordingly, the reliability of the portable electronic apparatus such as the notebook type personal computer is greatly improved.

Still another object of the present invention is to provide a disk unit mounting mechanism mountable with a disk unit characterized by a disk unit accommodating part accommodating the disk unit which is mounted, a lid member covering the disk unit accommodating part, and a vibration and/or shock absorbing member which absorbs vibration and/or shock and is arranged between the lid member and the disk unit which is mounted. By providing the vibration and/or shock absorbing members between the disk unit which is mounted and the lid member which covers the disk unit accommodating part provided in the housing, it is possible to improve the shock-resistance of the disk unit. Hence, it is possible to prevent data destruction from being generated in the disk unit, such as the HDD, due to the shock when the disk unit is dropped or is placed on a desk.

A further object of the present invention is to provide a disk unit mounting mechanism mountable with a disk unit having a disk unit accommodating part accommodating the disk unit which is mounted, a lid member covering the disk unit accommodating part, and a vibration and/or shock absorbing member, formed by a plurality of small pieces and absorbs vibration and/or shock, arranged between the lid member and the disk unit which is mounted, and a sheet member arranged between the plurality of small pieces forming the vibration and/or shock absorbing member and the disk unit which is mounted. By mounting the vibration and/or shock absorbing members on the sheet material, it is possible to prevent the deformation of the vibration and/or shock absorbing members. As a result, the shock resistance of the disk unit is improved, and in addition, it is possible to prevent an electrical short-circuit even when drop of dew form on the vibration and/or shock absorbing members.

Another object of the present invention is to provide a disk unit mounting mechanism mountable with a disk unit characterized by a disk unit accommodating part accommodating the disk unit which is mounted, and vibration and/or shock absorbing members arranged between an inner bottom surface and an inner side surface of the disk unit accommodating part and the disk unit which is mounted, wherein the vibration and/or shock absorbing member 3 arranged between the disk unit which is mounted and the inner bottom surface and the vibration and/or shock absorbing member arranged between the disk unit which is mounted and the inner side surface are made of mutually different materials. By providing the vibration and/or shock absorbing members between the disk unit and the inner surface of the disk unit accommodating part provided in the housing, it is possible to improve the vibration resistance of the disk unit, thereby preventing a read error from being generated. Further, in this case, the vibration resistance is required of the vibration and/or shock absorbing members provided between the disk unit and the inner surface of the disk unit accommodating part provided in the housing, while shock resistance is required of the vibration and/or shock absorbing members 3 provided between the disk unit and the inner bottom surface of the disk unit accommodating part. Hence, it is desirable that the vibration and/or shock absorbing members are made of mutually different materials.

Still another object of the present invention is to provide a disk unit mounting mechanism mountable with a disk unit characterized by a disk unit accommodating part accommodating the disk unit which is mounted, and vibration and/or shock absorbing members arranged between an inner bottom surface and an inner side surface of the disk unit accommodating part and the disk unit which is mounted, wherein the vibration and/or shock absorbing members arranged between the disk unit and the inner bottom surface and the vibration and/or shock absorbing member arranged between the disk unit and the inner side surface are made of materials having mutually different vibration and/or shock absorbing characteristics. By providing vibration and/or shock absorbing members having different vibration and/or shock absorbing characteristics, it is possible to effectively cope with shocks ranging from weak to strong shocks, and the vibration resistance and the shock resistance of the disk unit are improved.

A further object of the present invention is to provide a disk unit mounting mechanism mountable with a disk unit having a disk unit accommodating part accommodating the disk unit which is mounted, and a plurality of vibration and/or shock absorbing members having different thicknesses arranged with respect to at least one of confronting surfaces of the disk unit which is mounted and the disk unit accommodating part. By providing the vibration and/or shock absorbing members having the different thicknesses with respect to at least one surface of the disk unit, particularly with respect to a lid member, it is possible to use both a thin material and a thick material, for example, so that the shock resistance is improved with respect to various kinds of shocks ranging from weak to strong shocks.

Another object of the present invention is to provide a disk unit mounting mechanism mountable with a disk unit having a disk unit accommodating part accommodating the disk unit which is mounted, and a plurality of vibration and/or shock absorbing members having different vibration and/or shock absorbing characteristics arranged with respect to at least one of confronting surfaces of the disk unit which is mounted and the disk unit accommodating part. By providing the vibration and/or shock absorbing members with respect to at least one surface of the disk unit, particularly with respect to the side of a lid member, and forming the vibration and/or shock absorbing members from materials having different vibration and/or shock absorbing characteristics, it is possible to realize a shock resistance which can cope with a wide range of shocks ranging from weak to strong shocks.

Other objects and further features of the present invention will be apparent from the following detailed description when read in conjunction with the accompanying drawings.

DESCRIPTION OF THE PREFERRED EMBODIMENTS

Figure 1:
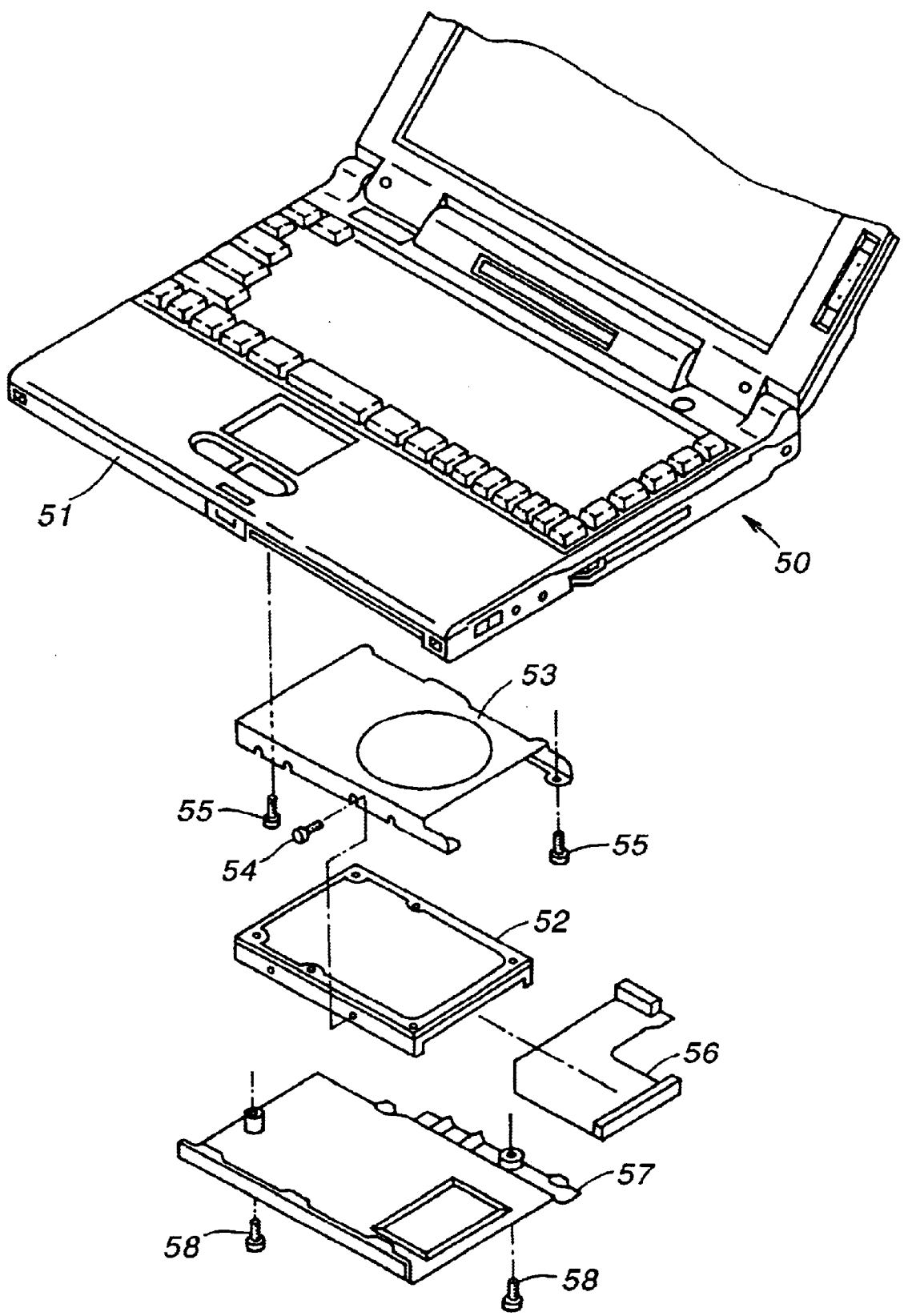
FIG. 1 is a disassembled perspective view showing an important part of a conventional notebook type personal computer.
Figure 2:
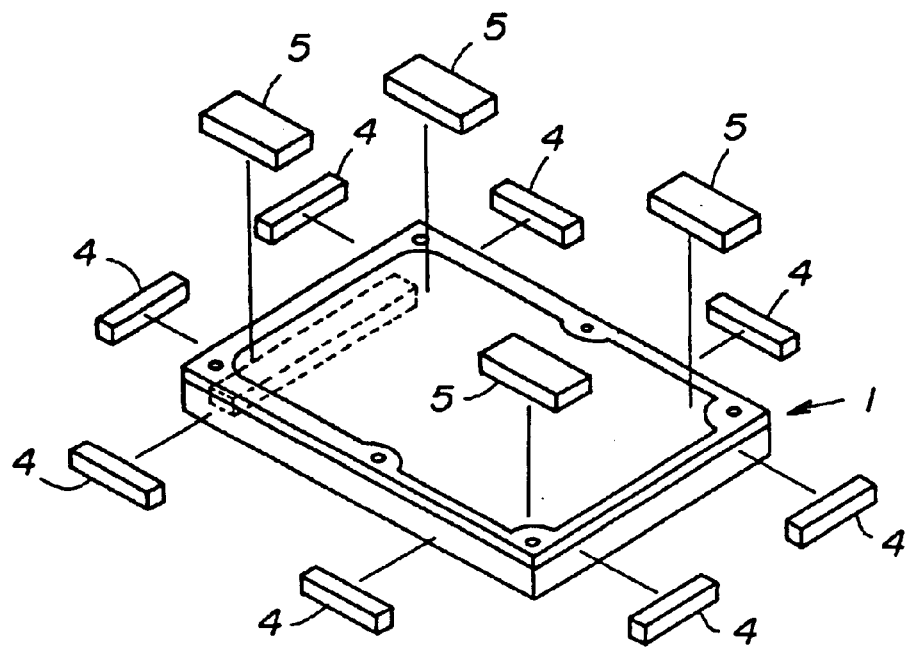
FIG. 2 is a diagram for explaining the operating principle of the present invention.
Figure 2:
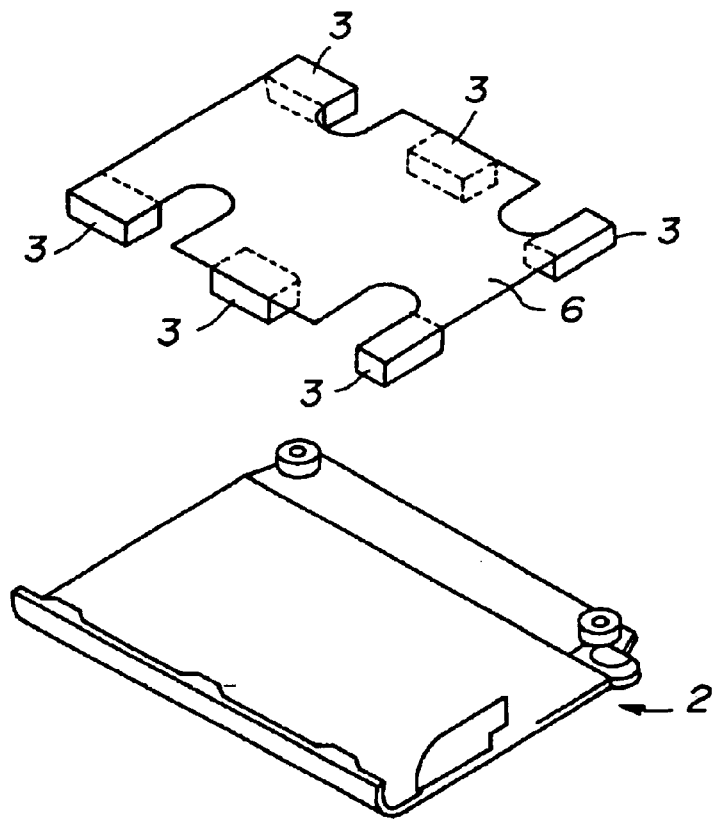

FIG. 2 is a diagram for explaining the operating principle of the present invention. A description will be given of means for solving the problems in the present invention, by referring to FIG. 2.

FIG. 2 is a disassembled perspective view generally showing a HDD (hard disk drive) mounting structure, and the illustration of a housing is omitted. Although the following description takes the HDD as an example of the disk unit, the application of the present invention is of course not limited to the HDD, and the present invention is similarly applicable to various kinds of disk units such as a FDD (floppy disk drive).

(1) An electronic apparatus mounted with a disk unit 1 in the present invention has vibration and/or shock absorbing members 3 which absorb vibration and/or shock provided between the disk unit 1 and a lid member 2 which covers a disk unit accommodating part provided in a housing of the electronic apparatus.

By providing the vibration and/or shock absorbing members 3 between the disk unit 1 and the lid member 2 which covers the disk unit accommodating part provided in the housing, it is possible to improve the shock-resistance of the electronic apparatus. Hence, it is possible to prevent data destruction from being generated in the disk unit 1, such as the HDD, as a result of shock when the electronic apparatus is dropped or is placed on a desk.

(2) In the present invention, as discussed in (1) above, the vibration and/or shock absorbing members 3 provided between the lid member 2 and the disk unit 1 are formed by a plurality of small pieces.

A single large vibration and/or shock absorbing member may be provided on the entire surface as the vibration and/or shock absorbing member 3. However, by forming the vibration and/or shock absorbing members 3 from the plurality of small pieces, it is possible to further improve the vibration resistance and the shock resistance.

(3) In the present invention, as discussed in (2) above, a sheet member 6 is provided between the disk unit 1 and the plurality of small pieces forming the vibration and/or shock absorbing members 3.

In general, the vibration and/or shock absorbing members 3 are made of a porous material having a large coefficient of friction. For this reason, if the lid member 2 were mounted by sliding the lid member 2, the vibration and/or shock absorbing members 3 would be deformed in a horizontal direction due to the friction and the vibration and/or shock absorbing effect would be reduced. However, by mounting the vibration and/or shock absorbing members 3 on the sheet material 6, it is possible to prevent the deformation of the vibration and/or shock absorbing members 3.

In addition, when drops of dew are formed on the vibration and/or shock absorbing members 3 which are provided between the lid member 2 and the disk unit 1, the moist vibration and/or shock absorbing members 3 will make contact with the printed circuit of the disk unit 1 because the vibration and/or shock absorbing member 3s dry slowly, thereby causing an electrical short-circuit. However, by interposing the sheet member 6 between the disk unit 1 and the vibration and/or shock absorbing members 3, it is possible to prevent an electrical short-circuit even when drops of dew are formed on the vibration and/or shock absorbing members 3.

(4) An electronic apparatus mounted with a disk unit 1 in the present invention has vibration and/or shock absorbing members 3 which formed by a plurality of small pieces and absorb vibration and/or shock are provided between the disk unit 1 and a lid member 2 which covers a disk unit accommodating part provided in a housing of the electronic apparatus, and a sheet member 6 is provided between the disk unit 1 and the plurality of small pieces forming the vibration and/or shock absorbing members 3.

As described above under (3) above, by mounting the vibration and/or shock absorbing members 3 on the sheet material 6, it is possible to prevent the deformation of the vibration and/or shock absorbing members 3. As a result, the shock resistance of the electronic apparatus is improved, and in addition, it is possible to prevent the electrical short-circuit even when the drops of the dew are formed on the vibration and/or shock absorbing members 3.

(5) An electronic apparatus mounted with a disk unit 1 in the present invention has vibration and/or shock absorbing members 3 and 4 provided between the disk unit 1 and an inner bottom surface and inner side surfaces of a disk unit accommodating part provided in a housing of the electronic apparatus, and the vibration and/or shock absorbing members 3 provided between the disk unit 1 and the inner bottom surface and the vibration and/or shock absorbing members 4 provided between the disk unit 1 and the inner surface are made of mutually different materials.

By providing the vibration and/or shock absorbing members 4 between the disk unit 1 and the inner surface of the disk unit accommodating part provided in the housing, it is possible to improve the vibration resistance of the disk unit 1, thereby preventing a read error from being generated.

Further, in this case, the vibration resistance is required of the vibration and/or shock absorbing members 4 provided between the disk unit 1 and the inner surface of the disk unit accommodating part provided in the housing, while the shock resistance is required of the vibration and/or shock absorbing members 3 provided between the disk unit 1 and the inner bottom surface of the disk unit accommodating part. Hence, it is desirable that the vibration and/or shock absorbing members 3 and 4 are made of mutually different materials.

(6) An electronic apparatus mounted with a disk unit 1 in the present invention has vibration and/or shock absorbing members 3, 4 and 5 provided between the disk unit 1 and an inner bottom surface and an inner side surface of a disk unit accommodating part provided in a housing of the electronic apparatus, and the vibration and/or shock absorbing members 3 and 5 provided between the disk unit 1 and the inner bottom surface and the vibration and/or shock absorbing member 4 provided between the disk unit 1 and the inner side surface are made of materials having mutually different vibration and/or shock absorbing characteristics.

By providing vibration and/or shock absorbing members having different vibration and/or shock absorbing characteristics, it is possible to effectively cope with shocks ranging from weak to strong, and the vibration resistance and the shock resistance of the electronic apparatus are improved.

(7) In the present invention, as discussed in (5) or (6) above, the vibration and/or shock absorbing member 4 provided between the disk unit 1 and the inner side surface is made of a material having a higher vibration resistance than a material forming the vibration and/or shock absorbing members 3 and 5 provided between the disk unit 1 and the inner bottom surface.

In this case, it is possible to flexibly cope with the vibration resistance and the shock resistance required by the electronic apparatus.

(8). In the present invention, as discussed in (5) or (6) above, the vibration and/or shock absorbing member 4 provided between the disk unit 1 and the inner side surface is made of a material which is harder than a material forming the vibration and/or shock absorbing members 3 and 5 provided between the disk unit 1 and the inner bottom surface.

In this case, it is possible to flexibly cope with the vibration resistance and the shock resistance required by the electronic apparatus.

(9) In the present invention, as discussed in any of (5) to (8) above, the vibration and/or shock absorbing members 4 provided between the disk unit 1 and the inner surface of the disk unit accommodating part provided in the housing are formed by a plurality of small pieces.

A single large vibration and/or shock absorbing member may be provided on the entire surface as the vibration and/or shock absorbing member 4 which is provided between the disk unit 1 and the inner surface of the disk unit accommodating part provided in the housing. However by forming the vibration and/or shock absorbing members 4 from the plurality of small pieces, it is possible to further improve the vibration resistance.

(10) An electronic apparatus mounted with a disk unit 1 in the present invention has a plurality of vibration and/or shock absorbing members 3, 4 and 5 having different thicknesses provided with respect to at least one of confronting surfaces of the disk unit 1 and a disk unit accommodating part provided in a housing of the electronic apparatus.

By providing the vibration and/or shock absorbing members 3, 4 and 5 having the different thicknesses with respect to at least one surface of the disk unit 1, particularly with respect to a lid member 2, it is possible to use a thin material and a thick material, for example, so that the shock resistance is improved with respect to various kinds of shocks ranging from weak to strong shocks.

(11) In the present invention, as discussed in (10) above, the plurality of vibration and/or shock absorbing members 3, 4 and 5 are made of the same material.

In this case, it is possible to flexibly cope with the vibration resistance and the shock resistance required by the electronic apparatus.

(12) An electronic apparatus mounted with a disk unit 1 in the present invention has a plurality of vibration and/or shock absorbing members 3, 4 and 5 having different vibration and/or shock absorbing characteristics provided with respect to at least one of confronting surfaces of the disk unit 1 and a disk unit accommodating part provided in a housing of the electronic apparatus.

By providing the vibration and/or shock absorbing members 3, 4 and 5 with respect to at least one surface of the disk unit 1, particularly, with respect to the side of a lid member 2, and forming the vibration and/or shock absorbing members 3, 4 and 5 from materials having different vibration and/or shock absorbing characteristics, it is possible to realize a shock resistance which can cope with a wide range of shocks ranging from weak to strong shocks.

(13) In the present invention as discussed in (10) or (12) above, the plurality of vibration and/or shock absorbing members 3, 4 and 5 are made of materials having different hardnesses.

In this case, it is possible to flexibly cope with the vibration resistance and the shock resistance required by the electronic apparatus.

(14) In the present invention, as discussed in any of (1) to (13) above, the vibration and/or shock absorbing members 5 are also provided between the disk unit 1 and an inner top surface of the disk unit accommodating part provided in the housing.

By providing the vibration and/or shock absorbing members 5 between the disk unit 1 and the inner top surface of the disk unit accommodating part provided in the housing, it is possible to further improve the vibration resistance and the shock resistance, and particularly the shock resistance.

(15) In the present invention, as discussed in any of (1) to (14) above, the vibration and/or shock absorbing members 3, 4 and 5 are adhered on a member confronting the disk unit 1.

From the point of view of the problems introduced by the dew drop and the ease of the assembling process, it is desirable to adhere the vibration and/or shock absorbing members 3, 4 and 5 on the member confronting the disk unit 1, that is, on a lid member 2 or, on the inner top surface or the inner side surface of the disk unit accommodating part provided in the housing.

(16) The present invention is characterized as discussed in any of (1) to (15) above, the electronic apparatus mounted with the disk unit 1 forms a portable electronic apparatus.

By applying the structure of the present invention to the portable electronic apparatus, it is possible to improve the reliability of the portable electronic apparatus with respect to the shock applied thereto when the portable electronic apparatus is carried.

(17) In the present invention, as discussed in any of (1) to (16) above, the disk unit 1 is a hard disk unit.

In this case, it is possible to improve the reliability of the hard disk unit.

(18) A disk unit mounting mechanism mountable with a disk unit 1 in the present invention has a disk unit accommodating part accommodating the disk unit 1 which is mounted, a lid member 2 covering the disk unit accommodating part, and a vibration and/or shock absorbing member 3 which absorbs vibration and/or shock and is arranged between the lid member 2 and the disk unit 1 which is mounted.

By providing the vibration and/or shock absorbing members 3 between the disk unit 1 which is mounted and the lid member 2 which covers the disk unit accommodating part provided in the housing, it is possible to improve the shock-resistance of the disk unit. Hence, it is possible to prevent data destruction from being generated in the disk unit 1, such as the HDD, as a result of the shock when the disk unit is dropped or is placed on a desk.

(19) A disk unit mounting mechanism mountable with a disk unit 1 in the present invention has a disk unit accommodating part accommodating the disk unit 1 which is mounted, a lid member 2 covering the disk unit accommodating part, and a vibration and/or shock absorbing member 3, formed by a plurality of small pieces and absorbs vibration and/or shock, arranged between the lid member and the disk unit which is mounted, and a sheet member 6 arranged between the plurality of small pieces forming the vibration and/or shock absorbing member 3 and the disk unit 1 which is mounted.

As described above under (3) above, by mounting the vibration and/or shock absorbing members 3 on the sheet material 6, it is possible to prevent, the deformation of the vibration and/or shock absorbing members 3. As a result, the shock resistance of the disk unit is improved, and in addition, it is possible to prevent an electrical short-circuit even when drops of dew are formed on the vibration and/or shock absorbing members 3.

(20) A disk unit mounting mechanism mountable with a disk unit 1 in the present invention has a disk unit accommodating part accommodating the disk unit 1 which is mounted, and vibration and/or shock absorbing members 3 and 4 arranged between an inner bottom surface and an inner side surface of the disk unit accommodating part and the disk unit 1 which is mounted, wherein the vibration and/or shock absorbing member 3 arranged between the disk unit 1 which is mounted and the inner bottom surface and the vibration and/or shock absorbing member 4 arranged between the disk unit 1 which is mounted and the inner side surface are made of mutually different materials.

By providing the vibration and/or shock absorbing members 4 between the disk unit 1 and the inner surface of the disk unit accommodating part provided in the housing, it is possible to improve the vibration resistance of the disk unit 1, thereby preventing a read error from being generated.

Further, in this case, the vibration resistance is required of the vibration and/or shock absorbing members 4 provided between the disk unit 1 and the inner surface of the disk unit accommodating part provided in the housing, while the shock resistance is required of the vibration and/or shock absorbing members 3 provided between the disk unit 1 and the inner bottom surface of the disk unit accommodating part. Hence, it is desirable that the vibration and/or shock absorbing members 3 and 4 are made of mutually different materials.

(21) A disk unit mounting mechanism mountable with a disk unit 1 in the present invention has a disk unit accommodating part accommodating the disk unit 1 which is mounted, and vibration and/or shock absorbing members 3, 4 and 5 arranged between an inner bottom surface and an inner side surface of the disk unit accommodating part and the disk unit 1 which is mounted, wherein the vibration and/or shock absorbing members 3 and 5 arranged between the disk unit 1 and the inner bottom surface and the vibration and/or shock absorbing member 4 arranged between the disk unit 1 and the inner side surface are made of materials having mutually different vibration and/or shock absorbing characteristics.

By providing vibration and/or shock absorbing members having different vibration and/or shock absorbing characteristics, it is possible to effectively cope with shocks ranging from weak to strong shocks, and the vibration resistance and the shock resistance of the disk unit are improved.

(22) A disk unit mounting mechanism mountable with a disk unit 1 in the present invention has a disk unit accommodating part accommodating the disk unit 1 which is mounted, and a plurality of vibration and/or shock absorbing members 3, 4 and 5 having different thicknesses arranged with respect to at least one of confronting surfaces of the disk unit 1 which is mounted and the disk unit accommodating part.

By providing the vibration and/or shock absorbing members 3, 4 and 5 having the different thicknesses with respect to at least one surface of the disk unit 1, particularly with respect to a lid member 2, it is possible to use a thin material and a thick material, for example, so that the shock resistance is improved with respect to various kinds of shocks ranging from weak to strong shocks.

(23) A disk unit mounting mechanism mountable with a disk unit 1 in the present invention has a disk unit accommodating part accommodating the disk unit 1 which is mounted, and a plurality of vibration and/or shock absorbing members 3, 4 and 5 having different vibration and/or shock absorbing characteristics arranged with respect to at least one of confronting surfaces of the disk unit 1 which is mounted and the disk unit accommodating part.

By providing the vibration and/or shock absorbing members 3, 4 and 5 with respect to at least one surface of the disk unit 1, particularly, with respect to the side of a lid member 2, and forming the vibration and/or shock absorbing members 3, 4 and 5 from materials having different vibration and/or shock absorbing characteristics, it is possible to realize a shock resistance which can cope with a wide range of shocks ranging from weak to strong shocks.

Next, a description will be given of a first embodiment of the present invention, by referring to FIGS. 3 through 6.

In order to simplify the description, the illustration and description of mounting structures of small parts which are not directly related to the subject matter of the present invention are omitted.

Figure 3A:
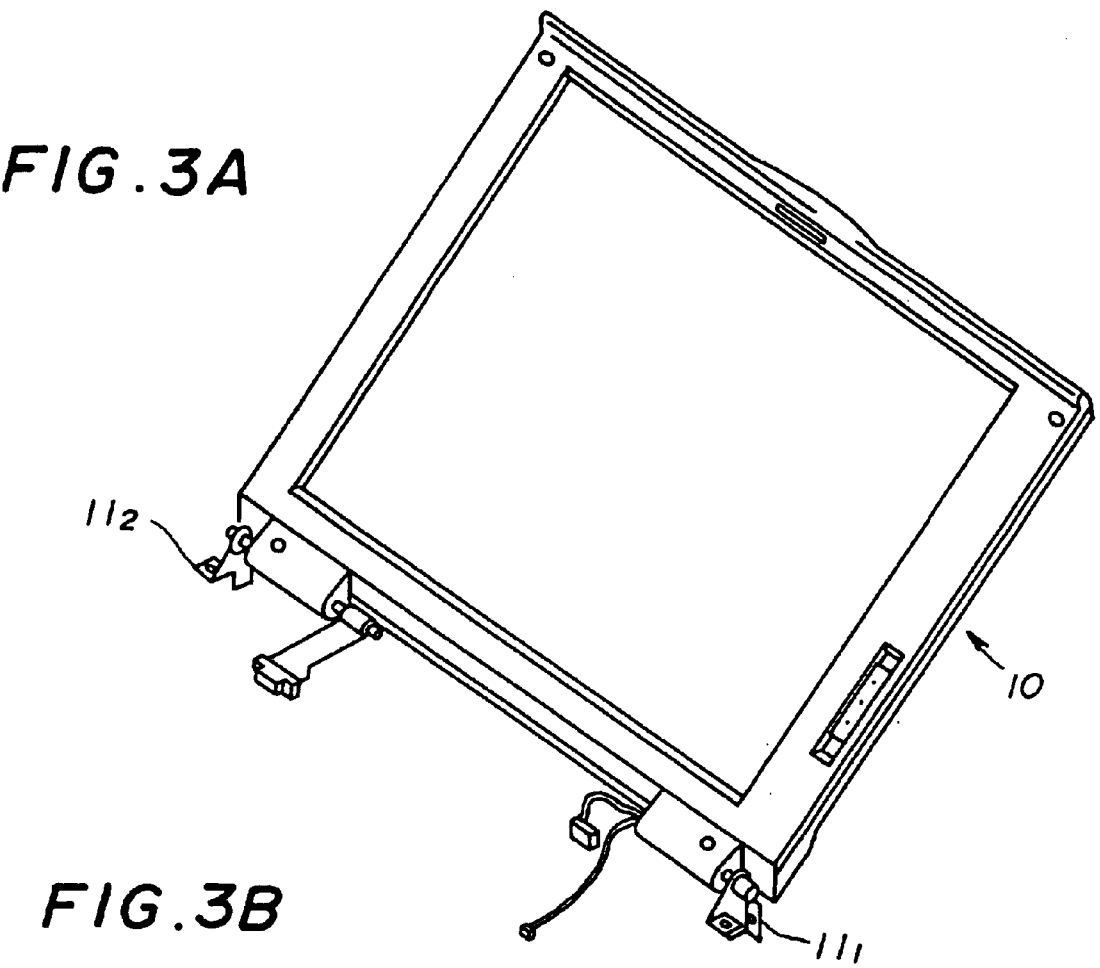
FIGS. 3A and 3B respectively are perspective views showing a display panel part and a housing top cover of a first embodiment of an electronic apparatus according to the present invention.

FIG. 3A is a perspective view showing a display panel part 10 of a notebook type personal computer. Mounting metal fittings $11_1$ and $11_2$ provided on both sides at a lower end of the display panel part 10 are positioned with respect to recesses of a plastic housing base 30 shown in FIG. 5, and are fixed to the housing base 30 by screws 31 and 32.

Figure 3B:
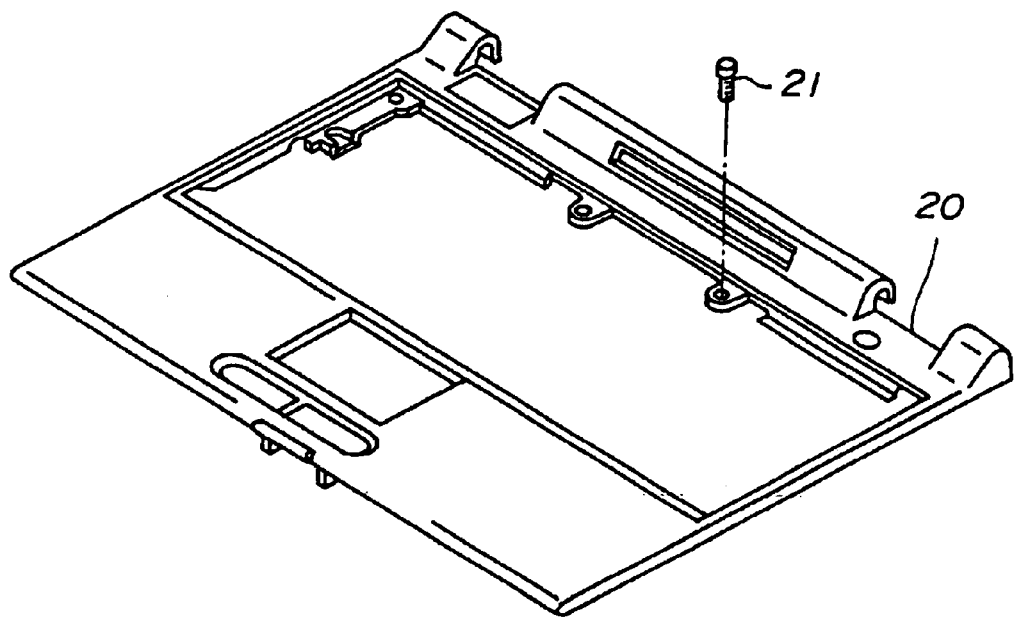

FIG. 3B is a perspective view showing a housing top cover 20 made of a plastic. The housing top cover 20 is positioned with respect to the housing base 30 shown in FIG. 5, and is fixed to the housing base 30 by screws 21, 32 and 33.

The screws 32 fix the housing top cover 20 on the housing base 30 via the mounting metal fittings $11_1$ and $11_2$.

Figure 4:
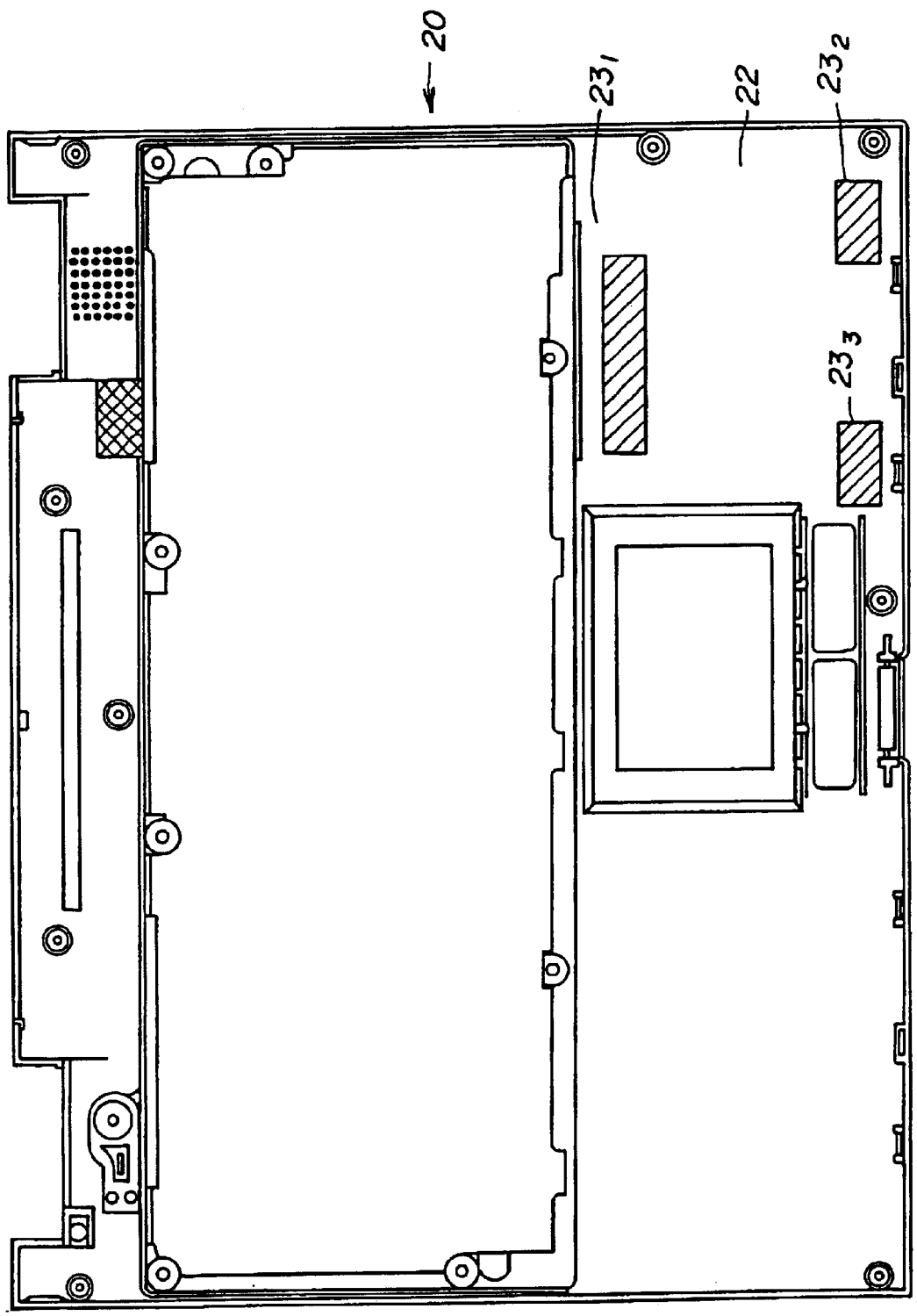
FIG. 4 is a bottom view showing the housing top cover of the first embodiment of the electronic apparatus.

FIG. 4 is a bottom view showing a back side of the housing top cover 20 shown in FIG. 3B. Two small pieces of vibration and/or shock absorbing members $23_1$, $23_2$ and $23_3$ are adhered on a part of the housing top cover making contact with a HDD 34, that is, on an inner top surface 22 of a HDD accommodating part 35.

For example, the vibration and/or shock absorbing members $23_1$, $23_2$ and $23_3$ have a thickness of 2 mm and are made of a soft ether system polyurethane (Sorbothane™).

Figure 5:
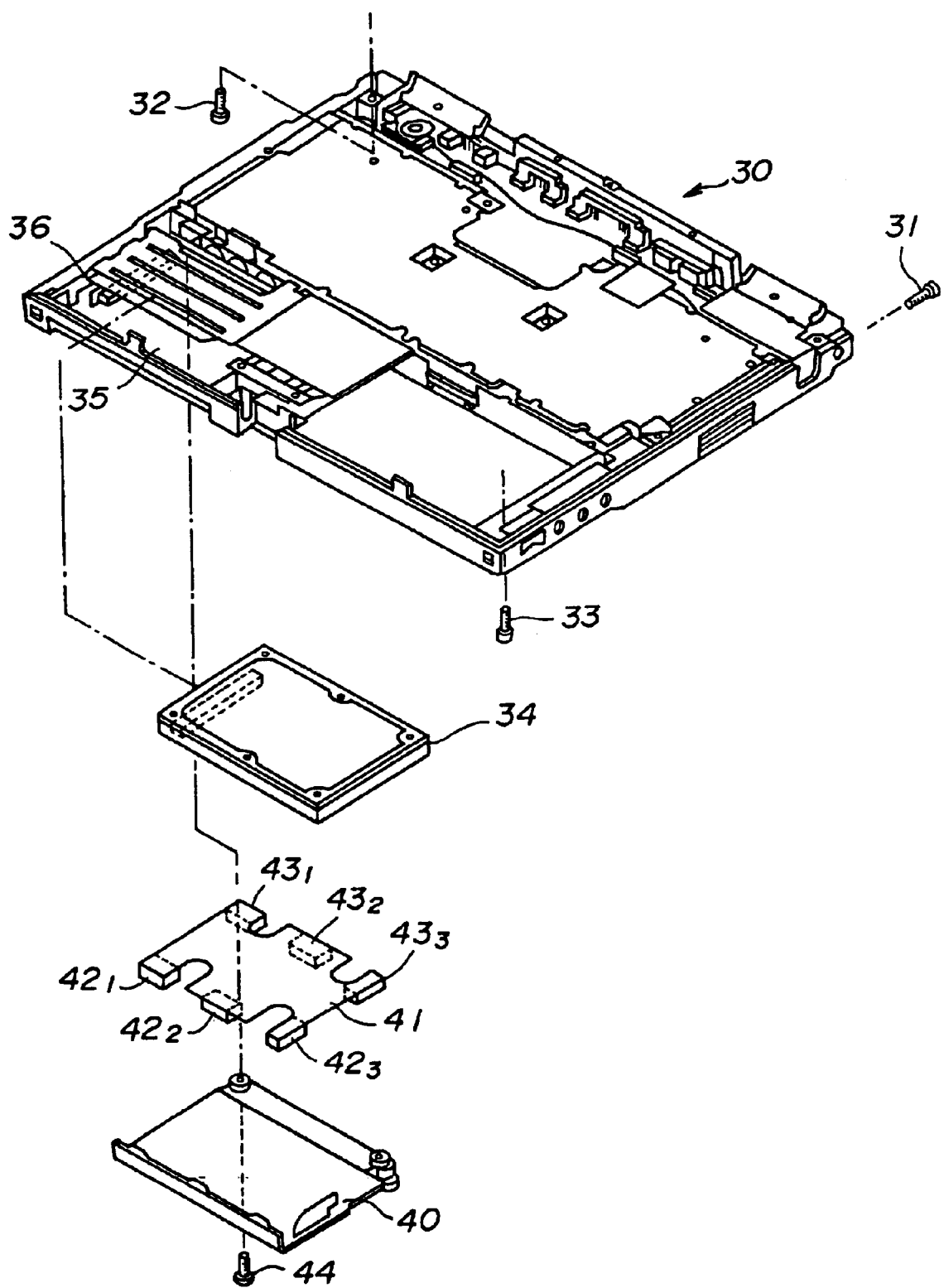
FIG. 5 is a disassembled perspective view showing a housing base of the first embodiment of the electronic apparatus.

FIG. 5 is a disassembled perspective view of the housing base 30 showing a mounting structure of the HDD 34. After accommodating the HDD 34 in the HDD accommodating part 35, a plastic lid member 40 is mounted at an opening of the HDD accommodating part 35 by sliding the lid member 40, and the lid member 40 is fixed on the housing base 30 by screws 44. The lid member 40 is provided with a sheet material 41 which is made of a polyester film. Three small pieces of vibration and/or shock absorbing members $42_1$, $42_2$ and $42_3$ are adhered along one of the 2 longer sides of the sheet material 41, and three small pieces of vibration and/or shock absorbing members $43_1$, $43_2$ and $43_3$ are adhered along the other of the 2 longer sides of the sheet material 41.

In FIG. 5, a connector with respect to a FPC cable 36 is indicated by broken lines on the left of the HDD 34.

Similarly to the vibration and/or shock absorbing members $23_1$, $23_2$ and $23_3$, the vibration and/or shock absorbing members $42_1$, $42_2$, $42_3$, $43_1$, $43_2$ and $43_3$ have a thickness of 2 mm and are made of a soft ether system polyurethane (Sorbothane™).

When the six vibration and/or shock absorbing members $42_1$, $42_2$, $42_3$, $43_1$, $43_2$ and $43_3$ made of the ether system polyurethane are provided, it was confirmed as a result of experiments conducted with regard to the shock resistance that, with respect to a shock which causes a maximum acceleration speed of 185.25 G in the case of the conventional HDD fixed by the screws, the maximum acceleration speed becomes 17.00 G in the case of the HDD 34 mounted with the mounting structure of this embodiment. Hence, the shock resistance of the HDD in this embodiment was greatly improved compared to the conventional HDD fixed by the screws.

The vibration and/or shock absorbing members $23_1$, $23_2$ and $23_3$ provided on the inner top surface of the HDD accommodating part 35 are arranged so as not to overlap the FPC cable 36 in a projection. Hence, the HDD 34 makes direct contact with the vibration and/or shock absorbing members $23_1$, $23_2$ and $23_3$, and the HDD 34 is protected from the vibration and/or shock by the vibration and/or shock absorbing members $23_1$, $23_2$, $23_3$, $42_1$, $42_2$, $42_3$, $43_1$, $43_2$ and $43_3$ provided above and below the HDD 34.

In addition, the sheet material 41 is provided so that the HDD 34 will not make direct contact with the vibration and/or shock absorbing members $42_1$, $42_2$, $42_3$, $43_1$, $43_2$ and $43_3$ which have a large coefficient of friction, when sliding the lid member 40 and mounting the lid member 40 at the opening of the HDD accommodating part 35. Thus, by using this sheet material 41, the vibration and/or shock absorbing members $42_1$, $42_2$, $42_3$, $43_1$, $43_2$ and $43_3$ will not be deformed in the horizontal direction due to the friction when the lid member is caused to slide, thereby making it possible to obtain the designed vibration resistance and shock resistance. Further, moisture absorbed by the vibration and/or shock absorbing members $42_1$, $42_2$, $42_3$, $43_1$, $43_2$ and $43_3$ will not cause an electrical short-circuit even if the vibration and/or shock absorbing members $42_1$, $42_2$, $42_3$, $43_1$, $43_2$ and $43_3$ are provided on a side of the HDD 34 having exposed wirings and/or electrical circuits.

Figure 6:
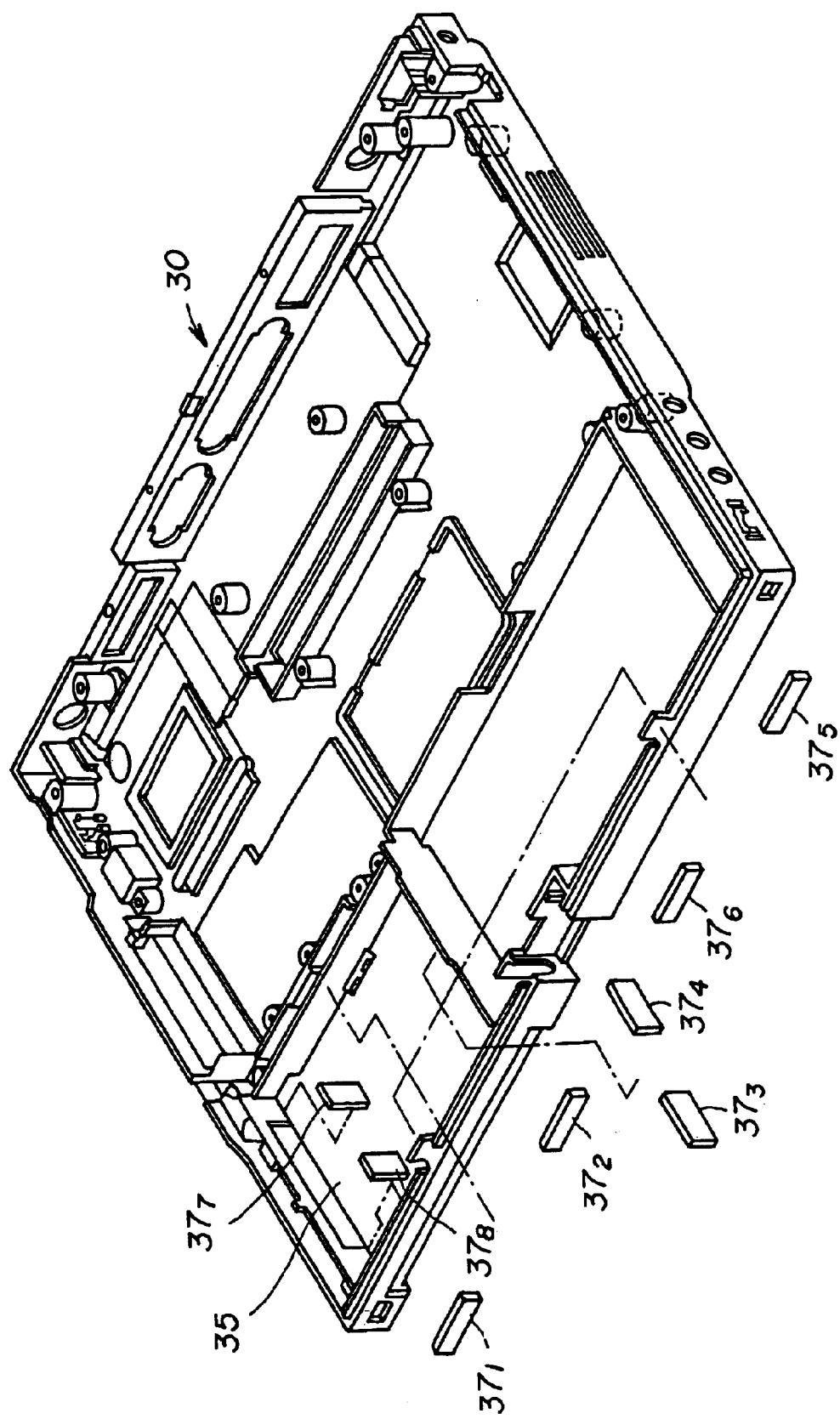
FIG. 6 is a perspective view showing a mounting structure of vibration and/or shock absorbing members on the housing base of the first embodiment of the electronic apparatus.

FIG. 6 is a perspective view of the housing base 30 showing the arrangement of vibration and/or shock absorbing members $37_1$ through $37_8$ provided on the inner side surfaces of the HDD accommodating part 35. In FIG. 6, the illustration of the mounting state of some of the small parts shown in FIG. 5 is omitted.

As shown in FIG. 6, two small pieces of the vibration and/or shock absorbing members $37_1$ through $36_8$ are adhered on each of the 4 inner side surfaces of the HDD accommodating part 35.

In this case, a high vibration resistance is required of the vibration and/or shock absorbing members $37_1$ through $37_8$, and thus, the vibration and/or shock absorbing members $37_1$ through $37_8$ must be made of a hard material compared to the vibration and/or shock absorbing member $23_1$ or the like. For example, a high-density urethane foam material having a thickness of 3 mm, a density of 0.48 g/cm$^3$, a tensile strength of 18.0 kg/cm$^2$, an elongation of 140%, a tear strength of 6.3 kg/cm, a compression strength of 2.5 kg/cm$^2$ to compress 25%, and a residual compression distortion of 3.9%.

By providing the vibration and/or shock absorbing members $37_1$ through $37_8$ on the inner side surfaces of the HDD accommodating part 35, the vibration resistance of the HDD 34 is improved. In addition, it is possible to prevent a read error from being generated due to residual vibration accompanying the rotation of the disk-shaped storage media when making a seek operation in the HDD 34.

As described above, in the first embodiment of the present invention, the small pieces of vibration and/or shock absorbing members $23_1$ through $23_3$, $42_1$ through $43_3$ and $37_1$ through $37_8$ are provided on the inner top and bottom surfaces and the 4 inner side surfaces, that is, a total of six surfaces, of the HDD accommodating part 35 making contact with the HDD 34. For this reason, it is possible to effectively protect the HDD 34 from the shock which is applied on the HDD when the notebook type personal computer is dropped or when the notebook type personal computer is placed on the desk, for example. As a result, the disk-shaped storage media is undamaged, and the reliability of the HDD 34 is improved because the fault caused by data destruction is prevented.

The reason why the vibration and/or shock absorbing member is divided into small pieces is because, as a result of various kinds of experiments which were conducted, it was found that the vibration resistance and the shock resistance are improved when small pieces of the vibration and/or shock absorbing members are used as compared to the case where a single large vibration and/or shock absorbing member is used.

In addition, since the sheet material 41 is used in this first embodiment, a short-circuit will not be generated by the vibration and/or shock absorbing members $42_1$, through $43_3$ which confront the printed circuit of the HDD 34, even when the drops of dew are formed on the vibration and/or shock absorbing members $42_1$ through $43_3$. Hence, the reliability of the HDD 34 is improved.

In the first embodiment described above, a polyester film is used as the sheet material 41. However, the material used for the sheet material 41 is not limited to polyester, and any insulator material having a small coefficient of friction, such as a teflon resin sheet material, may be used as the sheet material 41.

Figure 7A:
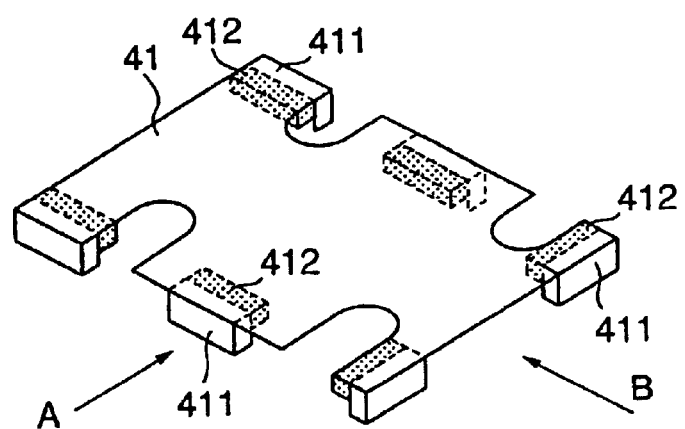
FIGS. 7A through 7C respectively are diagrams showing an important part of a second embodiment of the electronic apparatus.
Figure 7B:
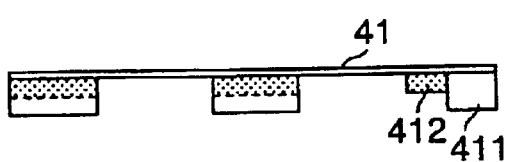
Figure 7C:
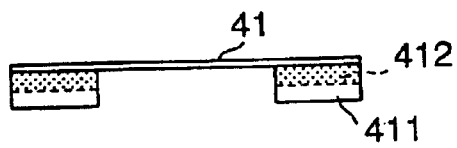

Next, a description will be given of a second embodiment of the present invention, by referring to FIGS. 7A through 7C. In this second embodiment, the structure of the vibration and/or shock absorbing material provided on the lid member 40 is different from that of the first embodiment, but the second embodiment is otherwise the same as the first embodiment. FIG. 7A is a perspective view showing an important part of the second embodiment, FIG. 7B is a side view viewed in a direction A in FIG. 7A, and FIG. 7C is a side view viewed in a direction B in FIG. 7A.

In this second embodiment, on a side of the sheet material 41 confronting the lid member 40, 3 small pieces of vibration and/or shock absorbing members 411 are adhered along one of the 2 longer sides of the sheet material 41, and three small pieces of vibration and/or shock absorbing members 412 are adhered along the other of the two longer sides of the sheet material 41, similarly to the first embodiment. The sheet material 41 is made of a polyester film, and the vibration and/or shock absorbing members 411 have a thickness of 2 mm and are made of a soft ether system polyurethane. In addition, vibration and/or shock absorbing members 412 having a thickness of 1.5 mm and made of an ether system polyurethane (Sorbothane™), which is harder than the vibration and/or shock absorbing members 411 are additionally provided between each of the vibration and/or shock absorbing members 411.

It is desirable that the thickness of the vibration and/or shock absorbing members 412 which are additionally provided is set approximately equal to a thickness at which the compressed vibration and/or shock absorbing members 411 lose the buffering effect. If the case of a weak shock, the shock is softly absorbed solely by the soft vibration and/or shock absorbing members 411. On the other hand, in the case of a strong shock, the shock is absorbed in 2 stages, that is, the soft vibration and/or shock absorbing members 411, and the hard vibration and/or shock absorbing members 412 which are additionally provided to absorb the shock which cannot be fully absorbed by the soft vibration and/or shock absorbing members 411. Therefore, as compared to the first embodiment, this second embodiment can more effectively cope with various kinds of shocks ranging from weak to strong shocks.

Figure 8A:
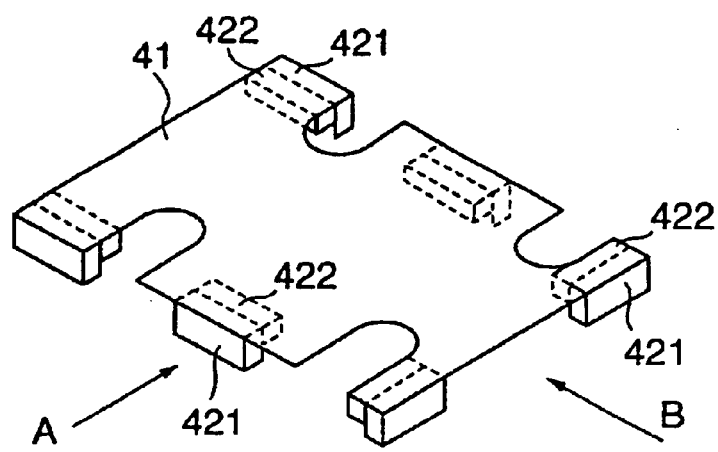
FIGS. 8A through 8C respectively are diagrams showing an important part of a first modification of the second embodiment of the electronic apparatus.
Figure 8B:
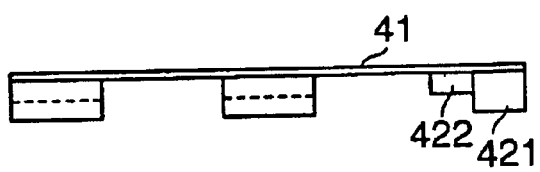
Figure 8C:
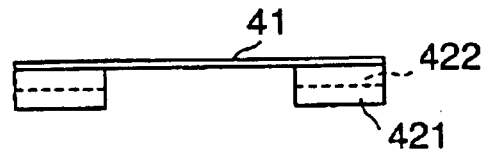

Next, a description will be given of a first modification of the second embodiment, by referring to FIGS. BA through 8C. FIG. 8A is a perspective view showing an important part of the first modification of the second embodiment, FIG. 8B is a side view viewed in a direction A in FIG. 8A, and FIG. 8C is a side view viewed in a direction B in FIG. 8A.

In this second embodiment, the 2-stage structure, made up of the soft vibration and/or shock absorbing members 411 and the hard vibration and/or shock absorbing members 412, is provided with respect to the lid member 40. However, the vibration and/or shock absorbing members 412 which are additionally provided are not limited to the material which is harder than the soft vibration and/or shock absorbing members 411. It is possible to realize the 2-stage structure by use of the same material (or the same hardness) but by varying the thicknesses of vibration and/or shock absorbing members 421 and vibration and/or shock absorbing members 422 which are additionally provided, as shown in FIGS. 8A through 8C. Alternatively, it is possible to realize the 2-state structure by using materials having mutually different vibration and/or shock absorbing characteristics for the vibration and/or shock absorbing members 421 and the vibration and/or shock absorbing members 422 which are additionally provided.

Figure 9:
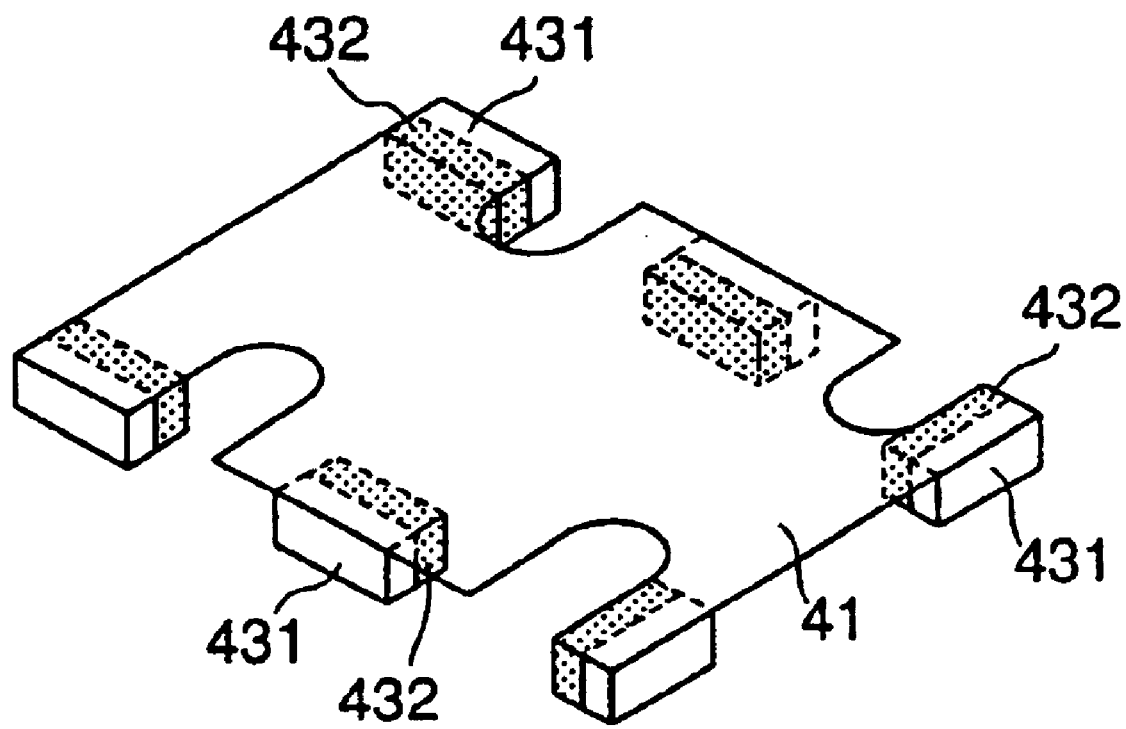
FIG. 9 is a perspective view showing an important part of a second modification of the second embodiment of the electronic apparatus.

Next, a description will be given of a second modification of the second embodiment, by referring to FIG. 9. FIG. 9 is a perspective view showing an important part of the second modification of the second embodiment.

In this second modification of the second embodiment, relative hardnesses of vibration and/or shock absorbing members 431 and 432 shown in FIG. 8 are different. For example, the relative hardness of the vibration and/or shock absorbing members 431 is greater than that of the vibration and/or shock absorbing members 432, or vice versa.

Furthermore, the vibration and/or shock absorbing members $23_1$ through $23_3$ provided on the inner top surface 22 of the HDD accommodating part 35 may also have the 2-stage structure described above. Moreover, the vibration and/or shock absorbing members $37_1$ through $37_8$ provided on the inner side surfaces of the HDD accommodating part 35 may also have the 2-stage structure described above. By using the 2-stage structure, the number of parts increases, but the vibration resistance and the shock resistance are further improved.

Figure 10:
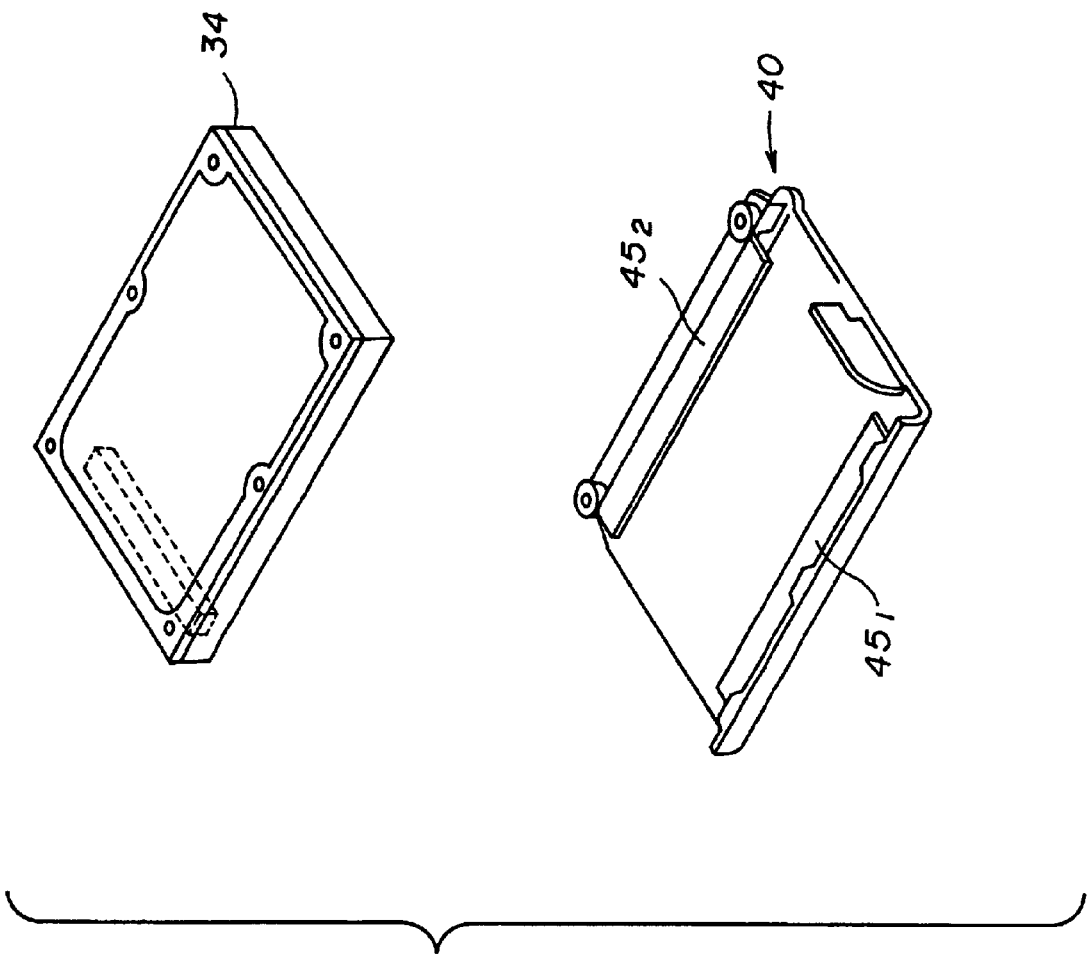
FIG. 10 is a perspective view showing a third embodiment of the electronic apparatus according to the present invention.

Next, a description will be given of a third embodiment of the present invention, by referring to FIG. 10.

In this third embodiment, the structure of the vibration and/or shock absorbing material provided on the lid member 40 is different from that of the first embodiment, but this third embodiment is otherwise the same as the first embodiment. Accordingly, a description will only be given with respect to the structure of the lid member 40.

In this third embodiment, a pair of elongated vibration and/or shock absorbing members $45_1$ and $45_2$ having a thickness of 2 mm and made of a soft ether system polyurethane (Sorbothane™) is adhered directly on the plastic lid member 40 on the surface of the lid member 40 confronting the HDD 34, along the two longer sides of the lid member 40.

It was confirmed as a result of experiments conducted with regard to the shock resistance that, with respect to a shock which causes a maximum acceleration speed of 185.25 G in the case of the conventional HDD fixed by the screws, the maximum acceleration speed becomes 139.19 G in the case of the HDD 34 mounted with the mounting structure of this embodiment. Hence, the shock resistance of the HDD in this embodiment was improved compared to the conventional HDD fixed by the screws.

The shock resistance obtained in this third embodiment is not as great as that obtained in the first embodiment. However, this third embodiment has an advantage over the first embodiment in that the number of vibration and/or shock absorbing members is small, and the operation of adhering the vibration and/or shock absorbing members can be simplified due to the small number of vibration and/or shock absorbing members.

In this third embodiment, the vibration and/or shock absorbing members $45_1$ and $45_2$ are adhered directly on the lid member 40. However, it is of course possible to adhere the vibration and/or shock absorbing members $45_1$ and $45_2$ via a polyethylene sheet material, similarly to the first embodiment described above.

Although the present invention is applied to the HDD in the embodiments described above, the application of the present invention is of course not limited to the HDD. The present invention is similarly applicable to various kinds of disk units, including floppy disk drives, compact disk units, DVD (digital video disk) units, MD (magnetic disk) units, and MO (magneto-optic) disk units.

For example, the soft vibration and/or shock absorbing members provided above and below the HDD accommodating part are not limited to the soft ether system polyurethane, and appropriate modifications may be made depending on the design specifications of the computer. In addition, the thickness of the vibration and/or shock absorbing members is of course not limited to 2 mm, and the thickness may be varied arbitrarily depending on the characteristic of the vibration and/or shock absorbing material used.

If the vibration and/or shock absorbing members are too soft or too thin, the shock resistance deteriorates. Hence, it is necessary to select the material and thickness of the vibration and/or shock absorbing members within a range such that the space occupied by the vibration and/or shock absorbing members within the HDD accommodating part will not increase considerably, so as to satisfy the design specifications, that is, guarantee a shock resistance of 300 G when the HDD is not in use, for example.

On the other hand, the vibration and/or shock absorbing members provided on the inner side surfaces of the HDD accommodating part are not limited to the high-density urethane foam having the characteristic of the above described embodiment. The thickness of these vibration and/or shock absorbing members is likewise not limited to 3 mm, and appropriate modifications may be made depending on the design specifications.

In addition, the present invention is applied to the notebook type personal computer in the embodiments described above. However, the application of the present invention is not limited to the notebook type personal computer, and the present invention is applicable to any portable electronic apparatus in general which is mounted with a disk unit such as a HDD, such as a notebook type word processor and a pen input type personal computer.

Therefore, according to the present invention, it is possible to improve the vibration resistance and the shock resistance because the disk unit such as the HDD is protected by small pieces of the vibration and/or shock absorbing members. As a result, it is possible to prevent data destruction from being generated in the disk unit due to the shock and to prevent a read error from being generated in the HDD due to the vibration. Accordingly, the reliability of the portable electronic apparatus such as the notebook type personal computer is greatly improved.

Moreover, the present invention is applicable to any kind of electronic apparatus mounted with or is designed to be mounted with a disk unit. Hence, the present invention is similarly applicable to a docking station or an extended peripheral unit which is connected to a portable information processing apparatus such as a notebook type computer, and is mounted with or is designed to be mounted with a disk unit.

Further, the present invention is not limited to these embodiments, but various variations and modifications may be made without departing from the scope of the present invention.

What is claimed is:

1. An electronic apparatus mounted with a disk unit, comprising:
   a vibration and/or shock absorbing member which absorbs vibration and/or shock provided between the disk unit and a lid member which covers a disk unit accommodating part provided in a housing of the electronic apparatus; and
   a resilient and electrically insulative sheet member provided between the disk unit and the vibration and/or shock absorbing member.

2. The electronic apparatus as claimed in claim 1, wherein the vibration and/or shock absorbing member provided between the lid member and the disk unit is formed by a plurality of small pieces.

3. An electronic apparatus mounted with a disk unit, comprising:
   a vibration and/or shock absorbing member, formed by a plurality of small pieces and absorbing vibration and/or shock, provided between the disk unit and a lid member which covers a disk unit accommodating part provided in a housing of the electronic apparatus; and
   a resilient and electrically insulative sheet member provided between the disk unit and the plurality of small pieces forming the vibration and/or shock absorbing member.

4. An electronic apparatus mounted with a disk unit, comprising:

vibration and/or shock absorbing members provided between the disk unit and an inner bottom surface and an inner side surface of a disk unit accommodating part provided in a housing of the electronic apparatus, and the vibration and/or shock absorbing member provided between the disk unit and the inner bottom surface and the vibration and/or shock absorbing member provided between the disk unit and the inner side surface are made of mutually different materials.

5. An electronic apparatus mounted with a disk unit, comprising:

vibration and/or shock absorbing members provided between the disk unit and an inner bottom surface and an inner side surface of a disk unit accommodating part provided in a housing of the electronic apparatus, wherein the vibration and/or shock absorbing member provided between the disk unit and the inner bottom surface and the vibration and/or shock absorbing member provided between the disk unit and the inner side surface are made of materials having mutually different vibration and/or shock absorbing characteristics.

6. The electronic apparatus as claimed in claims 4 or 5, wherein the vibration and/or shock absorbing member provided between the disk unit and the inner side surface is made of a material having a higher vibration resistance than a material forming the vibration and/or shock absorbing member provided between the disk unit and the inner bottom surface.

7. The electronic apparatus as claimed in claim 4 or 5, wherein the vibration and/or shock absorbing member provided between the disk unit and the inner side surface is made of a material which is harder than a material forming the vibration and/or shock absorbing member provided between the disk unit and the inner bottom surface.

8. The electronic apparatus as claimed in any of claims 4 or 5, wherein the vibration and/or shock absorbing member provided between the disk until and the inner side surface of the disk unit accommodating part provided in the housing is formed by a plurality of small pieces.

9. An electronic apparatus mounted with a disk unit, comprising:

a plurality of vibration and/or shock absorbing members, having different thicknesses, provided with respect to at least one of confronting surfaces of the disk unit and a disk unit and a disk unit accommodating part provided in a housing of the electronic apparatus, so that a thicker one of the vibration and/or shock absorbing members absorbs up to a predetermined vibration and/or shock and a thinner one of the vibration and/or shock absorbing members absorbs vibration and/or exceeding the predetermined vibration and/or shock.

10. The electronic apparatus as claimed in claim 9, wherein the plurality of vibration and/or shock absorbing members are made of the same material.

11. An electronic apparatus mounted with a disk unit, comprising:

a plurality of vibration and/or shock absorbing members, having different vibration and/or shock absorbing characteristics, provided with respect to at least one of confronting surfaces of the disk unit and a disk unit accommodating part provided in a housing of the electronic apparatus, so that a softer one of the vibration and/or shock absorbing members absorbs up to a predetermined vibration and/or shock and a harder one of the vibration and/or shock absorbing members absorbs vibration and/or shock exceeding the predetermined vibration and/or shock.

12. The electronic apparatus as claimed in claim 9 or 11, wherein the plurality of vibration and/or shock absorbing members are made of materials having different hardnesses.

13. The electronic apparatus as claimed in any of claims 1, 3, 4, 5, 9 or 11, wherein the vibration and/or shock absorbing member is also provided between the disk unit and an inner top surface of the disk unit accommodating part provided in the housing.

14. The electronic apparatus as claimed in any of claims 1, 3, 4, 5, 9 or 11, wherein the vibration and/or shock absorbing member is adhered on a member confronting the disk unit.

15. The electronic apparatus as claimed in any of claims 1, 3, 4, 5, 9 or 11, wherein the electronic apparatus mounted with the disk unit forms a portable electronic apparatus.

16. The electronic apparatus as claimed in any of claims 1, 3, 4, 5, 9 or 11 wherein the disk unit is a hard disk unit.

17. A disk unit mounting mechanism mountable with a disk unit, comprising:

a disk unit accommodating part accommodating the disk unit which is mounted;

a lid member covering the disk unit accommodating part;

a vibration and/or shock absorbing member which absorbs vibration and/or shock and is arranged between the lid member and the disk unit which is mounted; and a resilient and electrically insulative sheet member provided between the disk unit and the vibration and/or shock absorbing member.

18. A disk unit mounting mechanism mountable with a disk unit, comprising:

a disk unit accommodating part accommodating the disk unit which is mounted;

a lid member covering the disk unit accommodating part; and a vibration and/or shock absorbing member, formed by a plurality of small pieces and absorbs vibration and/or shock, arranged between the lid member and the disk unit which is mounted; and a resilient and electrically insulative sheet member arranged between the plurality of small pieces forming the vibration and/or shock absorbing member and the disk unit which is mounted.

19. A disk unit mounting mechanism mountable with a disk unit, comprising:

a disk unit accommodating part accommodating the disk unit which is mounted; and vibration and/or shock absorbing members arranged between an inner bottom surface and an inner side surface of the disk unit accommodating part and the disk unit which is mounted, wherein the vibration and/or shock absorbing member arranged between the disk unit which is mounted and the inner bottom surface and the vibration and/or shock absorbing member arranged between the disk unit which is mounted and the inner side surface are made of mutually different materials.

20. A disk unit mounting mechanism mountable with a disk unit, comprising:

a disk unit accommodating part accommodating the disk unit which is mounted; and vibration and/or shock absorbing members arranged between an inner bottom surface and an inner side surface of the disk unit accommodating part and the disk unit which is mounted, wherein the vibration and/or shock absorbing member arranged between the disk unit and the inner bottom surface and the vibration and/or shock absorbing member arranged between the disk unit and the inner side surface are made of materials having mutually different vibration and/or shock absorbing characteristics.

21. A disk unit mounting mechanism mountable with a disk unit, comprising:

a disk unit accommodating part accommodating the disk unit which is mounted; and a plurality of vibration and/or shock absorbing members having different thicknesses arranged with respect to at least one of confronting surfaces of the disk unit which is mounted and the disk unit accommodating part, so that a thicker one of the vibration and/or shock absorbing members absorbs up to a predetermined vibration and/or shock and a thinner one of the vibration and/or shock absorbing members absorbs vibration and/or shock exceeding the predetermined vibration and/or shock.

22. A disk unit mounting mechanism mountable with a disk unit, comprising:

a disk unit accommodating part accommodating the disk unit which is mounted; and a plurality of vibration and/or shock absorbing members having different vibration and/or shock absorbing characteristics arranged with respect to at least one of confronting surfaces of the disk unit which is mounted and the disk unit accommodating part, so that a softer one of the vibration and/or shock absorbing members absorbs up to a predetermined vibration and/or shock and a harder one of the vibration and/or shock absorbing members absorbs vibration and/or shock exceeding the predetermined vibration and/or shock.

23. An electronic apparatus mounted with a disk unit, comprising:

a vibration and/or shock absorbing member which absorbs vibration and/or shock provided between the disk unit and a lid member which covers a disk unit accommodating part provided in a housing of the electronic apparatus; and an electrically insulative sheet member provided between the disk unit and the vibration and/or shock absorbing member, wherein said insulative sheet member is slidable with respect to said disk unit.

24. An electronic apparatus mounted with a disk unit, comprising:

a vibration and/or shock absorbing member, formed by a plurality of small pieces and absorbing vibration and/or shock, provided between the disk unit and a lid member which covers a disk unit accommodating part provided in a housing of the electronic apparatus; and an electrically insulative sheet member provided between the disk unit and the plurality of small pieces forming the vibration and/or shock absorbing member, wherein said insulative sheet member is slidable with respect to said disk unit.

25. A disk unit mounting mechanism mountable with a disk unit, comprising:

a disk unit accommodating part accommodating the disk unit which is mounted;

a lid member covering the disk unit accommodating part;

a vibration and/or shock absorbing member which absorbs vibration and/or shock and is arranged between the lid member and the disk unit which is mounted; and an electrically insulative sheet member provided between the disk unit and the vibration and/or shock absorbing member, wherein said insulative sheet member is slidable with respect to said disk unit.

26. A disk unit mounting mechanism mountable with a disk unit, comprising:

a disk unit accommodating part accommodating the disk unit which is mounted;

a lid member covering the disk unit accommodating part; and a vibration and/or shock absorbing member, formed by a plurality of small pieces and absorbs vibration and/or shock, arranged between the lid member and the arranged between the plurality of small pieces forming the vibration and/or shock absorbing member and the disk unit which is mounted;

an electrically insulative sheet member arranged between the plurality of small pieces forming the vibration and/or shock absorbing member and the disk unit which is mounted, wherein said insulative sheet member is slidable with respect to said disk unit.

27. The electronic apparatus as claimed in claim 23, wherein the vibration and/or shock absorbing member provided between the lid member and the disk unit is formed by a plurality of small pieces.

28. The electronic apparatus as claimed in claim 27, wherein the insulative sheet member is provided between the disk unit and the plurality of small pieces forming the vibration and/or shock absorbing members.

29. The electronic apparatus as claimed in claim 4 or 5, wherein the vibration and/or shock absorbing member provided between the disk unit and the inner side surface is made of a material having a higher vibration absorbing characteristic than a material forming the vibration and/or shock absorbing member provided between the disk unit and the inner bottom surface, and the vibration and/or shock absorbing member provided between the disk unit and the inner bottom surface has a higher shock absorbing characteristic than the material forming the vibration and/or shock absorbing member provided between the disk unit and the inner side surface.

30. The disk unit mounting mechanism as claimed in claim 20 or 21, wherein the vibration and/or shock absorbing member provided between the disk unit and the inner side surface is made of a material having a higher vibration absorbing characteristic than a material forming the vibration and/or shock absorbing member provided between the disk unit and the inner bottom surface, and the vibration and/or shock absorbing member provided between the disk unit and the inner bottom surface has a higher shock absorbing characteristic than the material forming the vibration and/or shock absorbing member provided between the disk unit and the inner side surface.

* * * * *